United States Patent [19]

Stephens

[11] Patent Number: 5,528,662
[45] Date of Patent: Jun. 18, 1996

[54] ACTIVE STRAPPING AND SWITCHING DEVICE FOR TELEPHONE LINE TESTING

[75] Inventor: Charles D. Stephens, Dallas, Tex.

[73] Assignee: Communications Technology Corporation, Dallas, Tex.

[21] Appl. No.: 947,307

[22] Filed: Sep. 18, 1992

[51] Int. Cl.$^6$ ................................................. H04M 1/24
[52] U.S. Cl. ................................................. 379/29
[58] Field of Search .............................. 379/27, 29, 5, 379/6, 9, 10, 30, 31, 16, 22, 26

[56] References Cited

U.S. PATENT DOCUMENTS

| | | | |
|---|---|---|---|
| Re. 33,281 | 7/1990 | Ray et al. | 379/25 |
| 3,699,274 | 10/1972 | Bennett | 379/25 |
| 3,902,026 | 8/1975 | Rogers et al. | 379/25 X |
| 4,127,748 | 11/1978 | Gillemot | 379/327 |
| 4,418,250 | 11/1983 | Hilligoss | 379/24 |
| 4,520,234 | 5/1985 | Fields et al. | 379/29 |
| 4,523,061 | 6/1985 | Dagan et al. | 200/17 R |
| 4,524,321 | 6/1985 | Jablway et al. | 379/25 X |
| 4,536,703 | 8/1985 | Jablway et al. | 379/21 X |
| 4,538,033 | 8/1985 | Bruce et al. | 379/28 |
| 4,590,336 | 5/1986 | Ray et al. | 379/20 |
| 4,609,789 | 9/1986 | Ray et al. | 379/118 |
| 4,639,557 | 1/1987 | Butler et al. | 379/29 |
| 4,661,969 | 4/1987 | Bulter et al. | 379/1 |
| 4,663,776 | 5/1987 | Wever et al. | 379/29 |
| 4,706,271 | 11/1987 | Hilligoss et al. | 379/49 |
| 4,841,560 | 6/1989 | Chan et al. | 379/29 |
| 4,843,620 | 6/1989 | Hagedorn | 379/21 |
| 4,864,597 | 9/1989 | Fore | 379/6 |
| 4,912,755 | 3/1990 | Blood et al. | 379/6 |

*Primary Examiner*—Stephen Chin
*Assistant Examiner*—Kevin Kim
*Attorney, Agent, or Firm*—Crutsinger & Booth

[57] ABSTRACT

Disclosed is a self-contained battery powered remotely controlled strapping and interconnection device for providing various selected interconnections and terminations of telephone lines or line pairs to which it is attached in order to establish testing configurations comprising a plurality of multi-contact latching relays selectably operable through a plurality of shift register devices under the control of an on-board processor responsive to dual tone multi-frequency instructional command signals remotely applied to a pair of lines. Plug-in expansion modules and battery charger modules are provided.

16 Claims, 15 Drawing Sheets

TWO OR THREE WIRE STRAPPING FOR REL. FAULT LOCATION

PAIR LOOP BACK FOR LOCATING OPENS FROM FAR END WITHOUT RELOCATING TO FAR END

2 OR 4 WIRE OPEN AND/OR LOOP BACK FOR TRANSMISSION TESTING OR POWER INFLUENCE ISOLATION

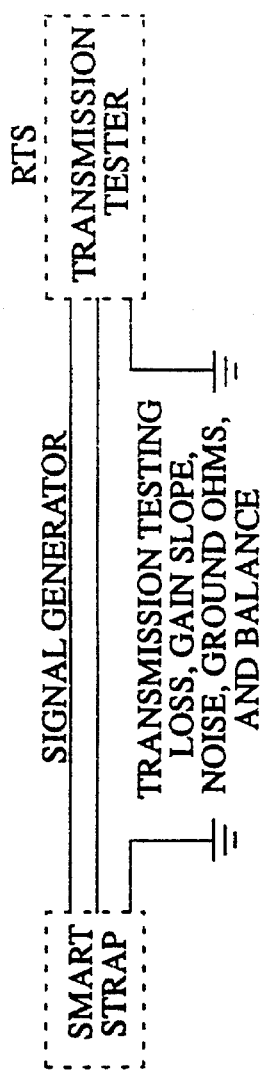
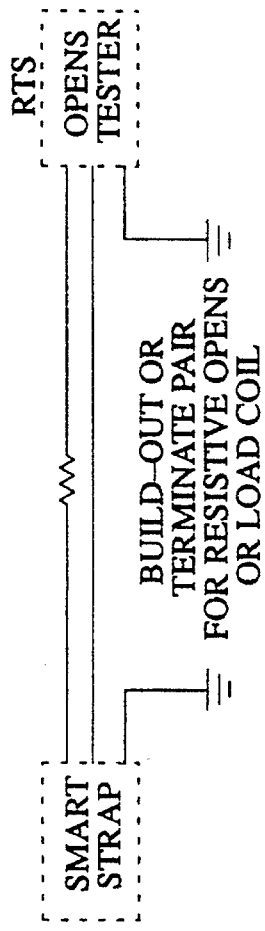
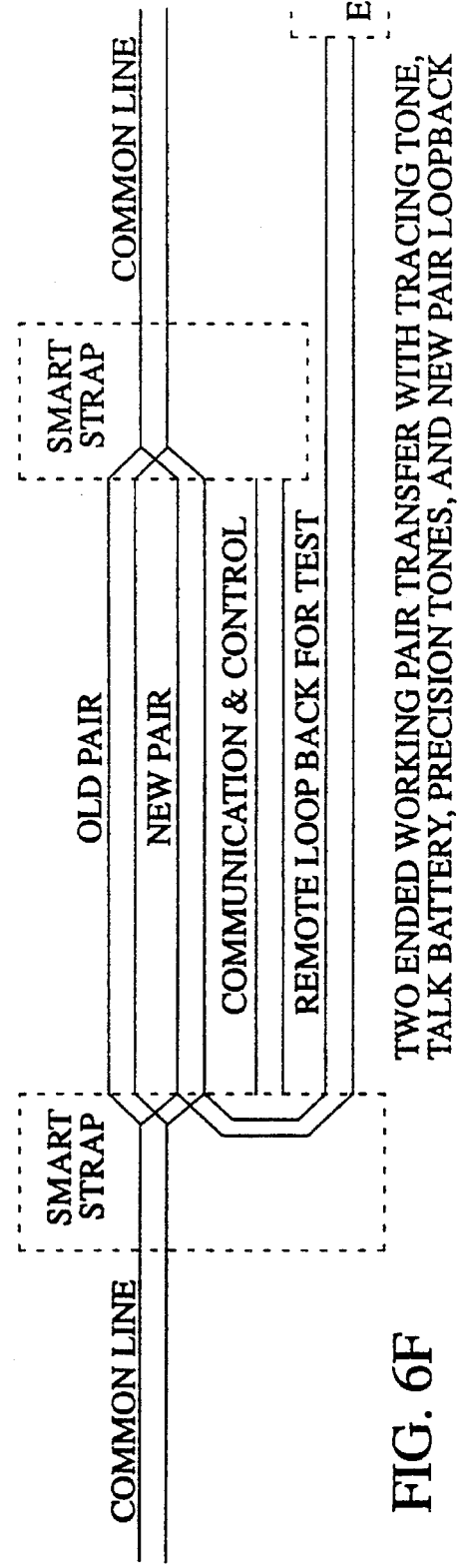
FIG. 6D
FIG. 6E
FIG. 6F

ACTIVE STRAPPING AND SWITCHING DEVICE FOR TELEPHONE LINE TESTING

BACKGROUND OF INVENTION

The present invention relates to telephone system test equipment and more particularly to equipment operable by a single craft person or technician remotely to condition telephone lines for testing procedures. Such conditioning previously required either two technicians or other operating personnel stationed at opposite ends of a cable section to be tested or protracted moving back and forth between sometimes widely separated points on the cable to be tested by a single operating technician.

In many situations it is required that various tests be conducted on sections of telephone lines or multi-line cables which sections may be from a few feet to several miles long. The tests are commonly conducted from one end of the section and require that certain of the single lines or pairs be interconnected or switched into various configurations at the ends remote from the end at which testing equipment is connected.

In order for such testing to be conducted by a single technician it has previously been necessary for that technician to travel back and forth between the ends of the section under test in order to arrange the lines into the appropriate configuration for each test. Although it is seemingly a more efficient use of manpower for a team of two technicians, one at each end of the line section, to conduct the tests it has been found that there is sometimes miscommunication between the technicians and so extra time is required to insure that the tests are properly conducted and that the test results are accurate.

SUMMARY OF THE INVENTION

The present invention is a small battery powered remotely controlled switching device adapted to be connected to a plurality of telephone lines at one end of a section of lines or cable to be tested. The device is controlled by a technician at the other end of the section under test to provide various switching and interconnection functions so that multiple tests may be conducted on a large number of lines in the section without the necessity of the technician again having to travel to the remote end of the section.

The basic unit device of the present invention hereinafter called an active strap or strapper contains in its preferred configuration a plurality of latching double pole double throw switching relays under the control of a plurality of series connected shift register drive circuits operating in response to impulses from an integrated circuit microcontroller in accordance with command signals received from the technician test operator in the form of standard dual tone multi-frequency dialing tones from the technician's hand set.

Also included in the active strap device of the present invention are an internal power source of rechargeable batteries and voltage and current control circuits as well as certain test signal generating and analyzing devices.

The entire active strap device of the present invention is contained in a housing having a generally long slender configuration in order that it may be left inside closed junction boxes or pedestals, cross-boxes or splice cases when in use.

Therefore, from the foregoing it is the general object of the present invention to provide a novel remotely controlled telephone installer's and repairman's tool for providing a plurality of various interconnection and test configurations as well as communication on and between one or more lines or line pairs at a relatively distant location by remote control signals applied at a local tap or connection to said lines or line pairs. Other and further objects, features and advantages of the present invention will be readily apparent to those skilled in the art from the following detailed description of the preferred embodiment of the invention when read with reference to the accompanying drawings.

DETAILED DESCRIPTION OF THE PREFERRED EMBODIMENT

The active strap apparatus of the present invention is designed for temporary or relatively permanent installation connected to a plurality of electrical wire lines such as telephone lines at a convenient location such as within pedestals, cross-boxes and splice cases. The active strap apparatus of the present invention may be controlled to perform various interconnection signal generation and routing connections to and between the lines to which it is connected through electrical signals applied to selected ones of said lines or pairs. Thus, a single installer or repair technician can by remote control of the active strap device to produce, at a distant point, selected interconnection of the lines with each other or with generated signals or with other elements as needed to conduct tests from other locations along the lines.

Figure 1:
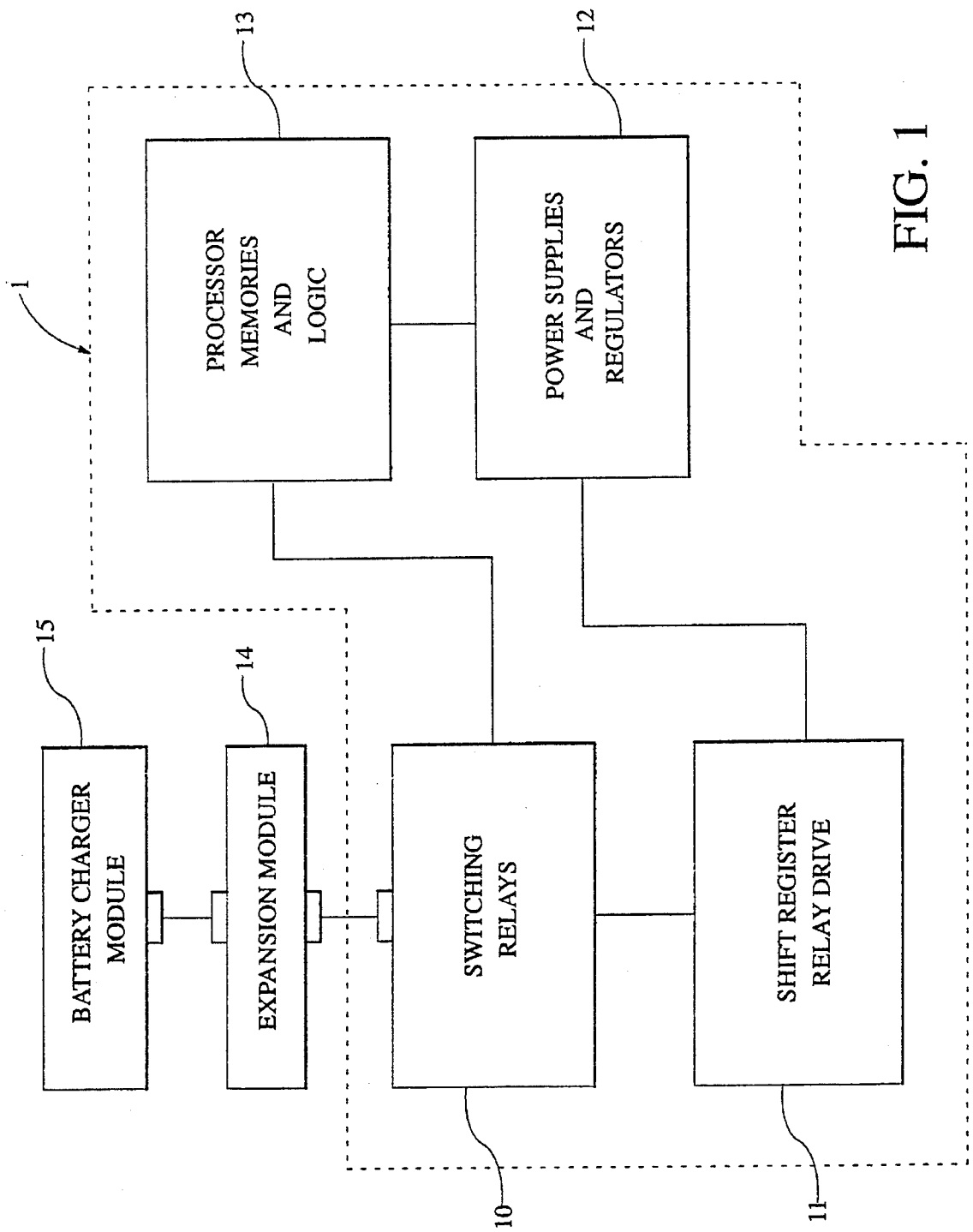
FIG. 1 is a block diagram illustrating the principal functional elements of the active strap device of the present invention.

As shown in the block diagram of FIG. 1, the active strap apparatus of the present invention generally designated as 1 comprises a section 10 of switching relays, a section 11 of shift register relay drives, a power supply and regulator section 12 and a digital control section 13 including processor, memories and logic. In addition, the system may optionally comprise one or more expansion modules 14 and a battery charger module 15.

Figure 2:
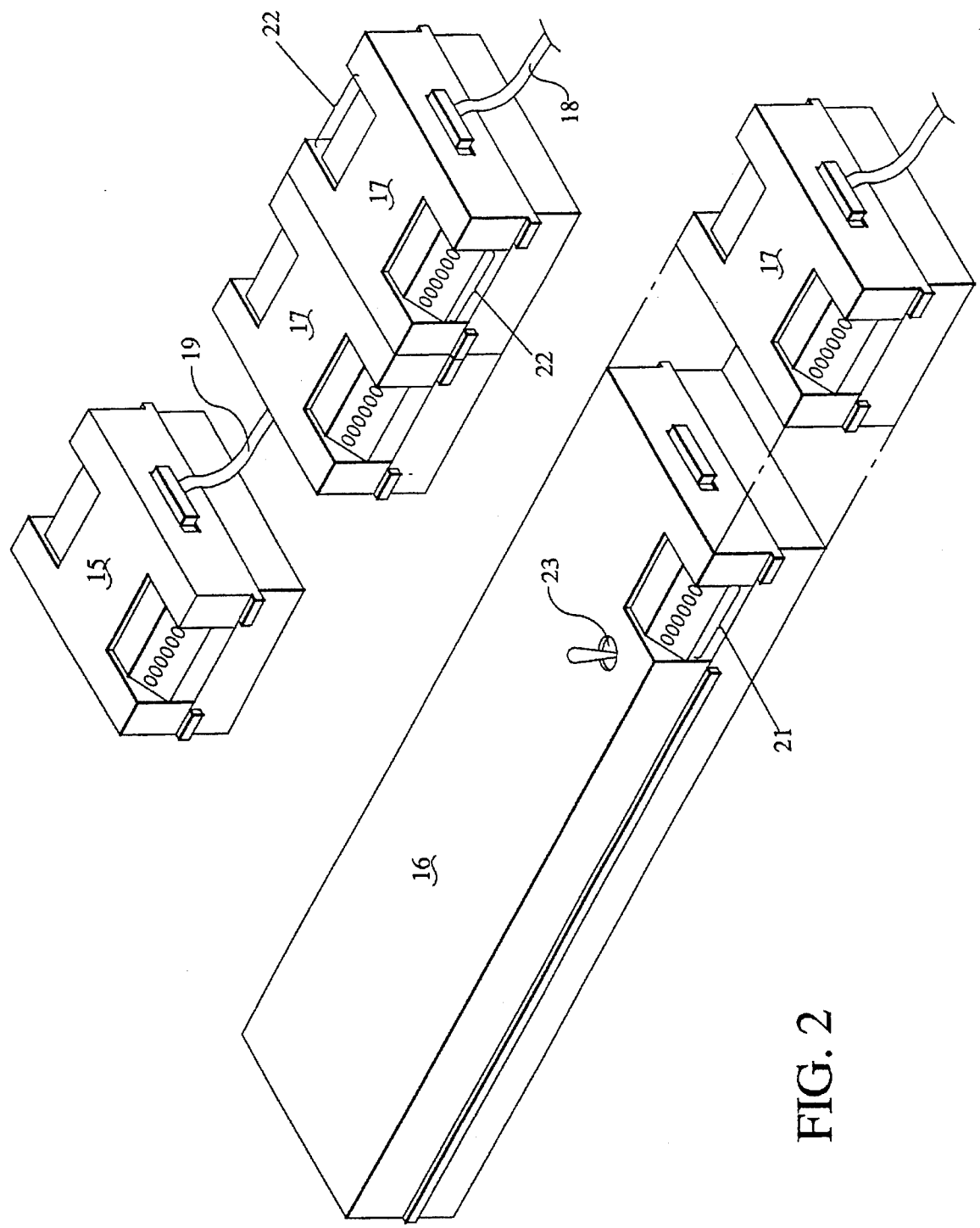
FIG. 2 is a perspective view of the physical external configuration of the active strap device of the present invention with separate compatible expansion and battery charging modules.

The switching relay, relay drive, power supply regulator and digital control sections 10–13 are preferably housed within a single enclosure of plastic or other non-metallic material such as the case 16 shown in perspective in FIG. 2. Also shown in FIG. 2 are housings 17 each containing an expansion module 14 adapted direct interconnection or for interconnection by means of a cable 18 with the active strap apparatus 1 and/or other expansion modules. The battery charger module 15 may be connected by cable 19 to batteries 20 in the active strapping device either directly or through intervening expansion modules.

Housing 16 is of long slim narrow design dimensions so that it may be easily accommodated in a closed pedestal, cross-box or splice case and left therein for an extended period of time. Expansion module housings 17 are essentially of the same dimensions as the strapping device housing except for length. Should it be found difficult or impossible to fit an active strap apparatus with a desired number of expansion modules into a single available space, say in one side of a pedestal, then some of the expansion modules may be placed in another space and interconnected to the main units by a cable 18.

Housing 16 has access openings 21 through which connections of the various lines to the active strap circuits may be made such as by means of compression spring contacts. Expansion module housings 17 provides similar openings 22 for connection access to their internal circuits. The active strap apparatus may conveniently provide for connection of four line pairs and a ground. The expansion module may conveniently provide access connections for four line pairs as will be more fully described subsequently. Housing 16 also provides access to the power switch control at 23.

Figure 3:
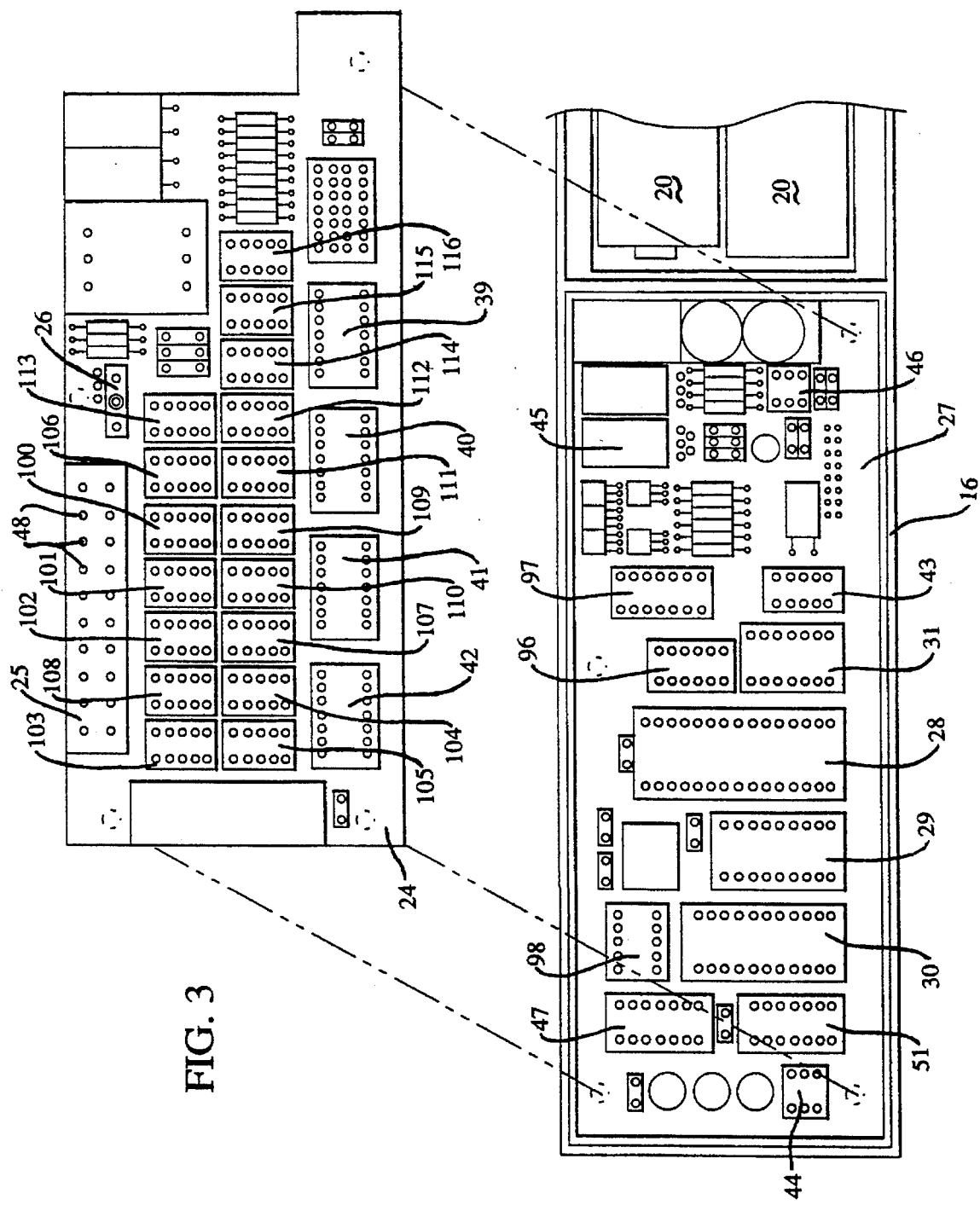
FIG. 3 is a diagram illustrating the physical arrangement of the various circuit elements on the two main circuit boards of the device of the present invention.
Figure 4A:
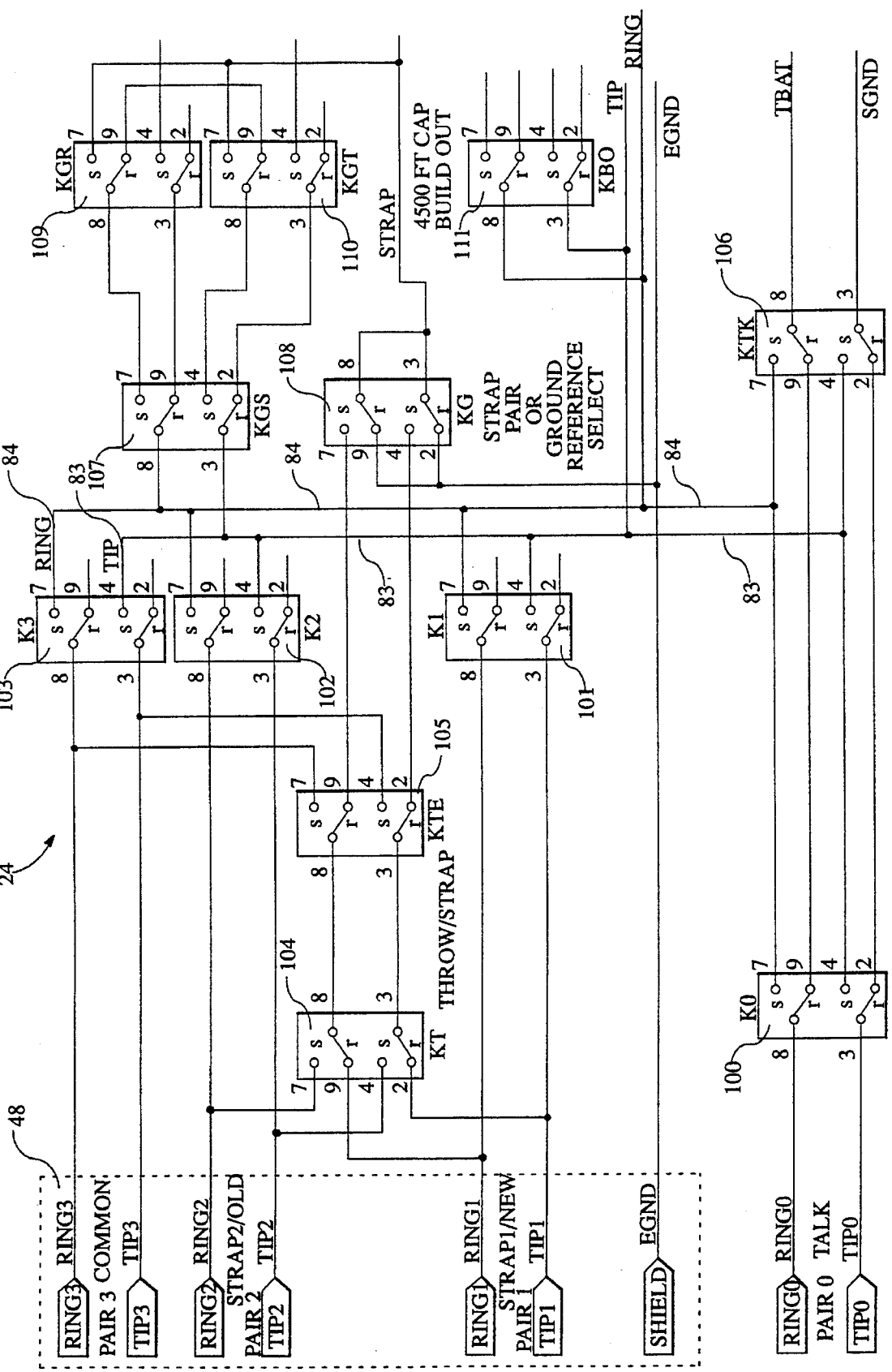
FIG. 4 is an electrical schematic diagram illustrating the interconnections of the switching relay and shift register drive circuits and other elements of the analog section of the active strap device of the present invention.
Figure 4B:
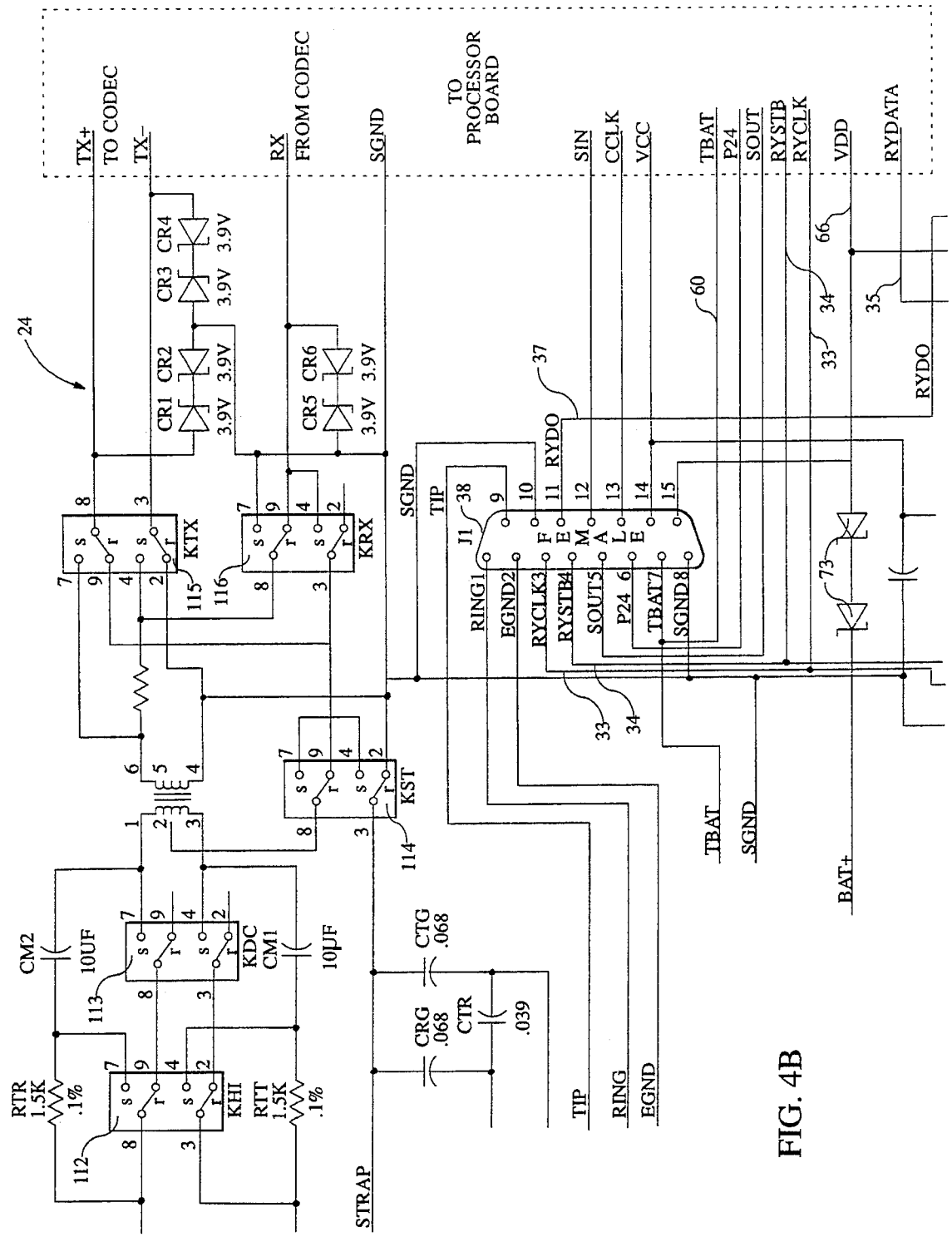
Figure 4C:
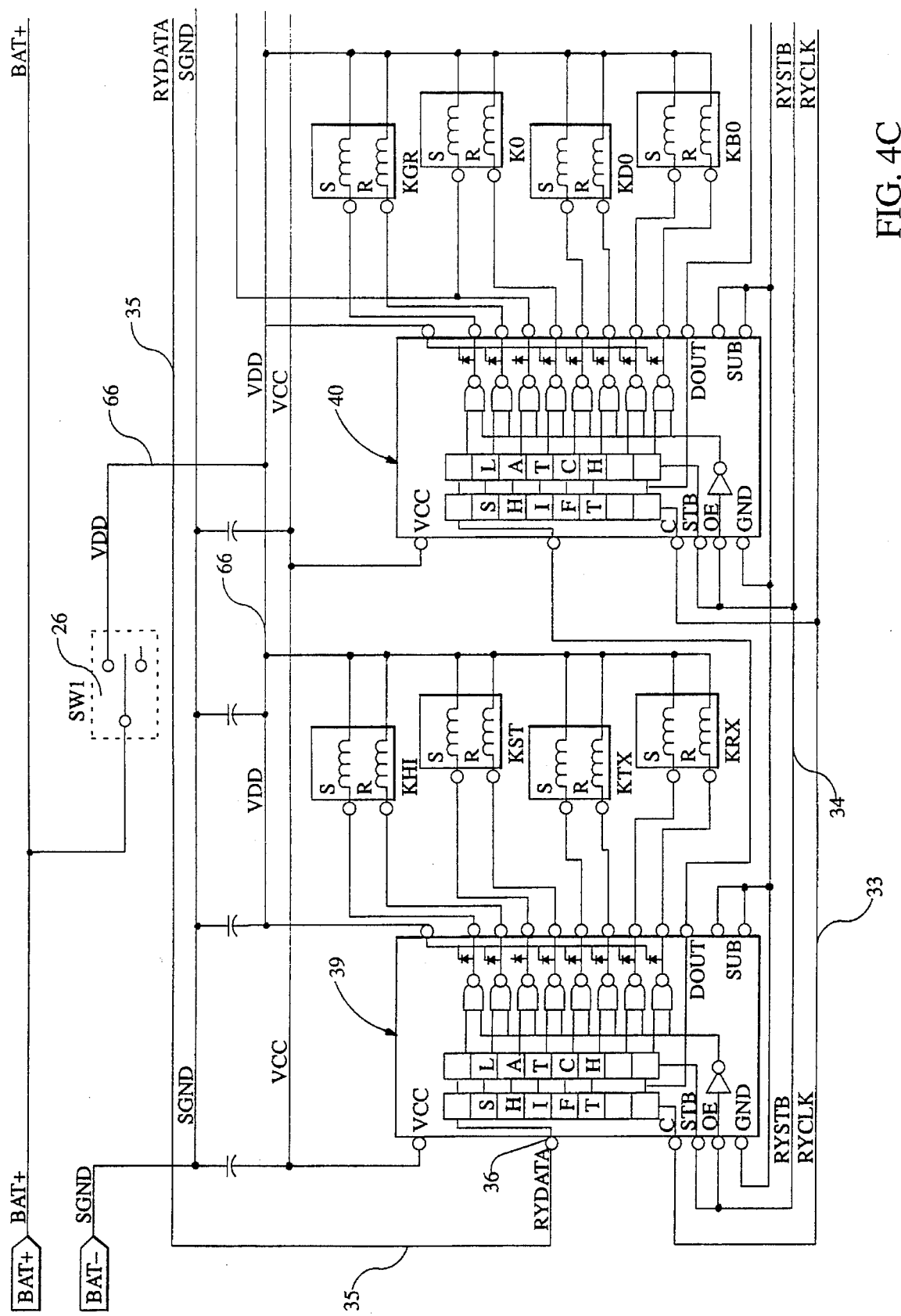
Figure 4D:
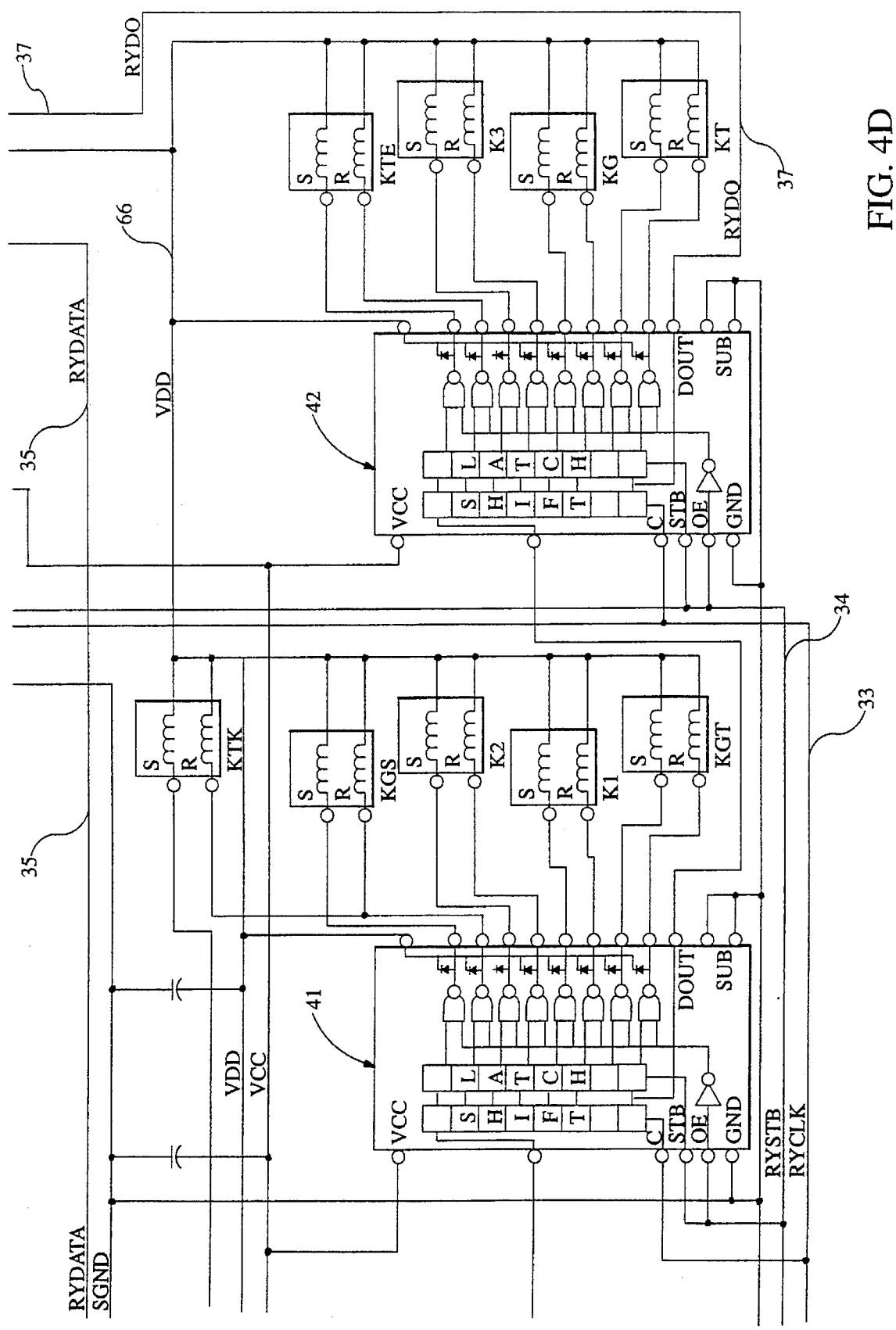
Figure 5A:
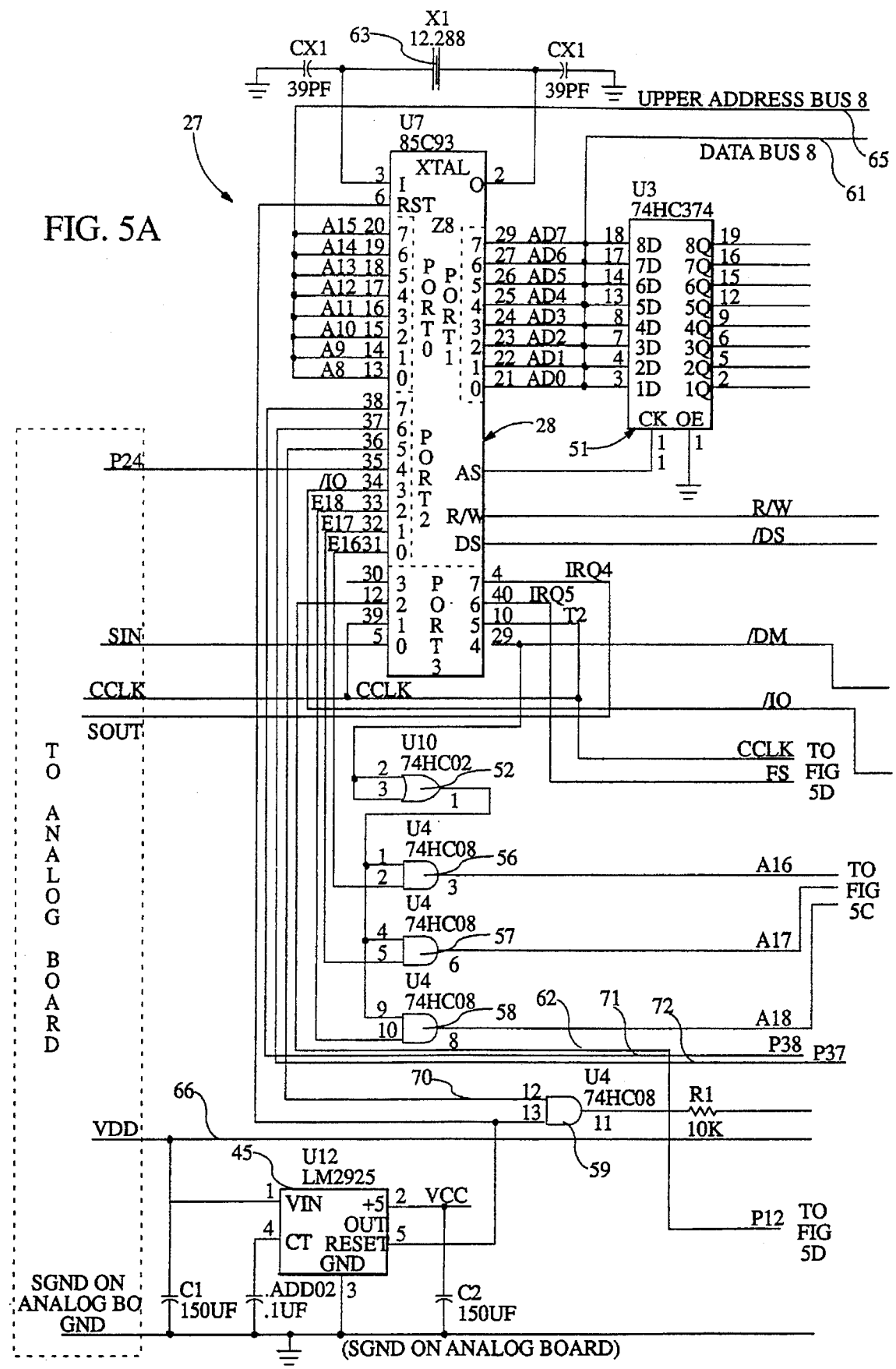
FIG. 5 is an electrical schematic diagram illustrating interconnections of the processor, memory, logic signal generation and detection and other elements of the digital section of the strap device of the present invention.
Figure 5B:
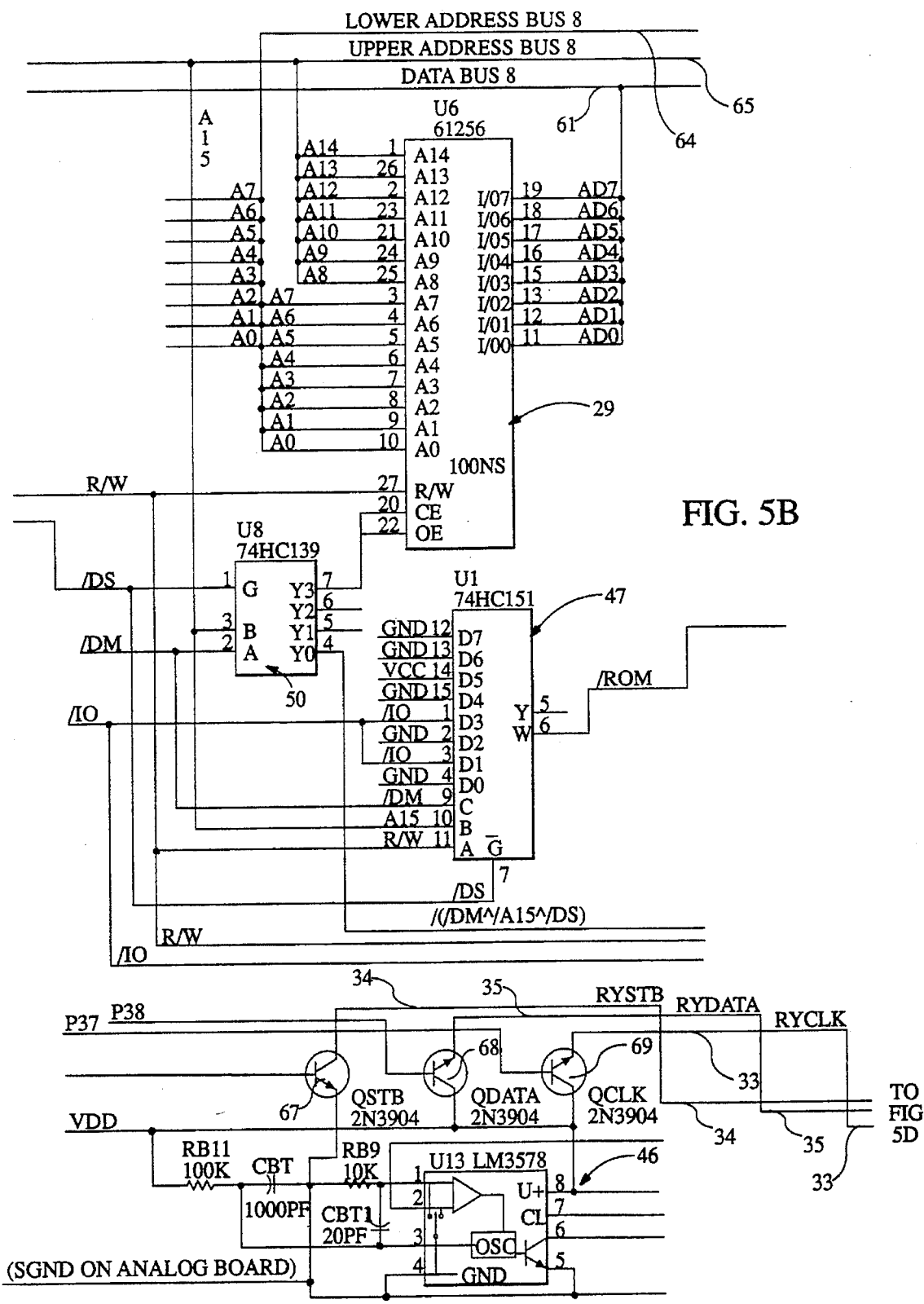
Figure 5C:
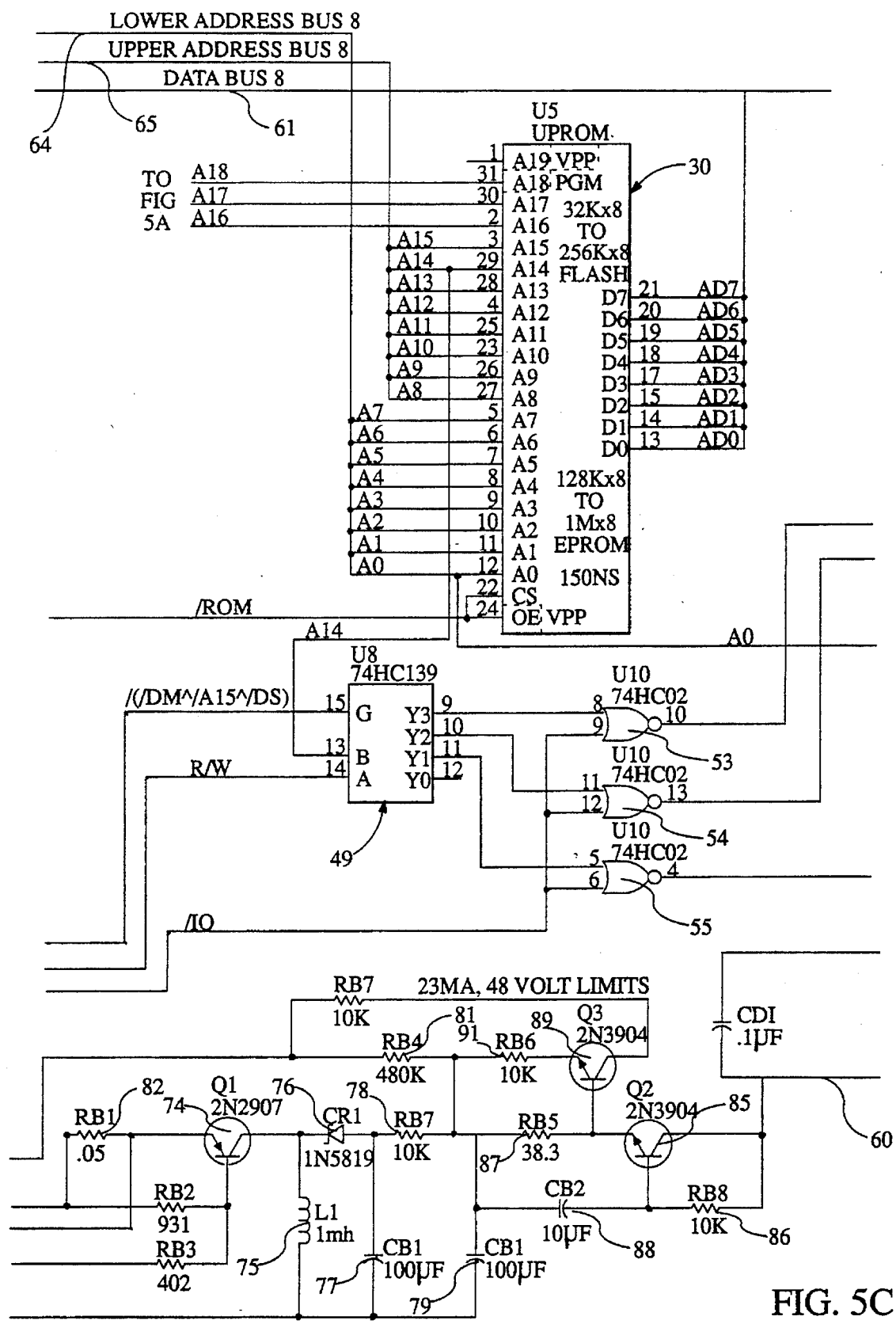
Figure 5D:
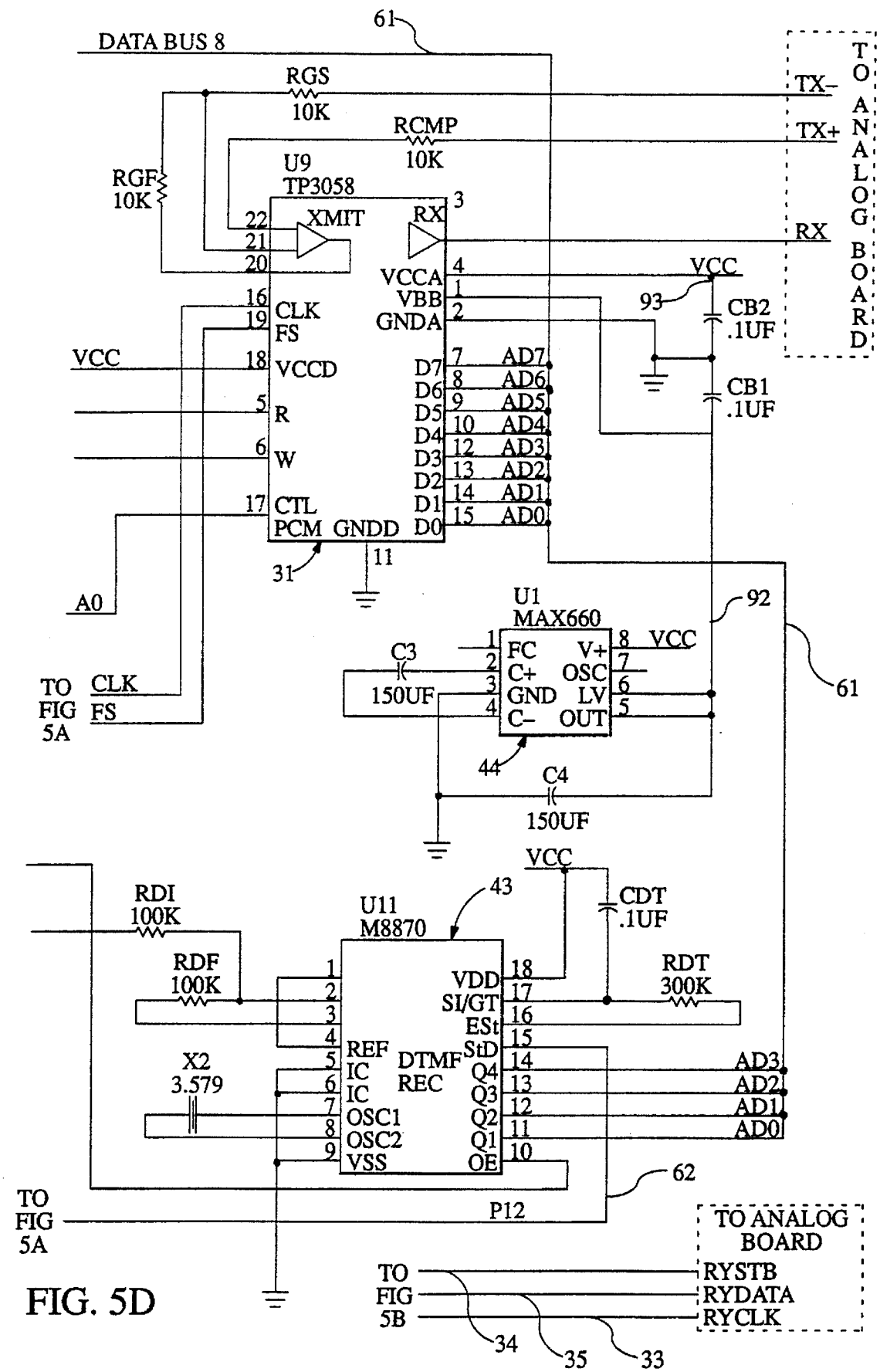

Within the housing 16 the switching relays 100–116 and their associated elements of section 10 and the shift registers 39–42 and their associated elements of relay drive section 11 may be mounted on a single circuit board 24 (referred to also as the analog circuit board) as shown in FIG. 3. Circuit board 24 also accommodates the input connection pad 25 and power switch 26. A second circuit board 27 also referred to as the processor board mounts the digital control section 13 including a processor "chip" 28, a random access memory device (RAM) 29, an erasable programmable read-only memory (EPROM) 30, a coder-decoder "chip" (CODEC) 31 and their associated elements together with various elements of the power supply-regulator section 12.

Within the housing 16 circuit board 24 is stacked on top of circuit board 27.

A more detailed schematic diagram of the circuit embodied in the analog board 24 is shown in FIG. 4. The schematic of the circuit embodied on the processor board 27 is shown in FIG. 5.

In making use of the active strap apparatus of the present invention, the technician/repairman installs the strap at one end of the lines or cable section on which the tests or other operations are to be conducted. In that installation, the ends of three line pairs to be tested and a fourth line pair to be used for control and communication together with a ground line are connected through access openings 21 to the external line connectors 48, the terminals in FIG. 4 also labeled as "pair one", "pair two", "pair three" and "pair zero" and EGND, respectively. The active strap device is then turned "on" by operation of switch 26. The technician/repairman then moves to the other end of the section of lines or cable which may be up to several miles away and makes connection of his "craft" phone to that end of the pair zero lines and connects his test equipment as appropriate to any or all of line pairs 1–3. The technician may at this time instruct the active strap device by dialing the appropriate numerical code for the device to make any of numerous available connection configurations to or between line pairs to carry out test or repair operations.

Figure 6A:
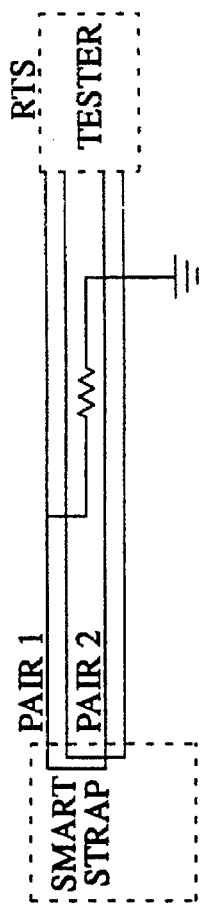
FIG. 6 schematically illustrates some of the numerous circuit configurations producible on command by the active strap device of the present invention.
Figure 6B:
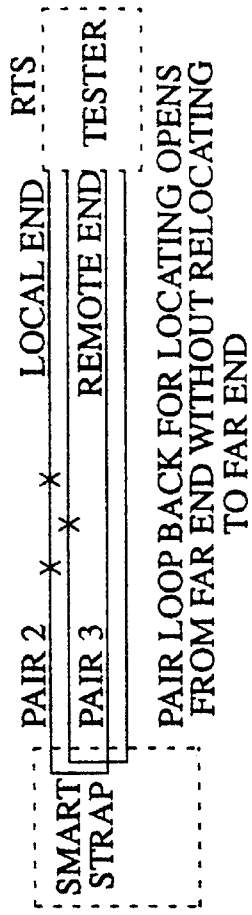
Figure 6C:
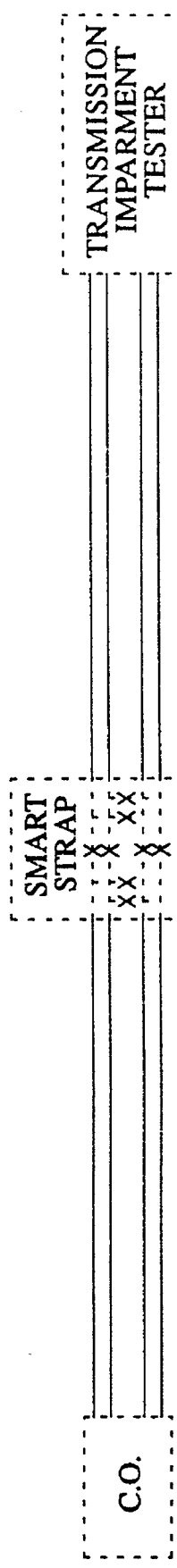

Examples of the several configurations available are shown in the diagram of FIG. 6. Diagram A illustrates a configuration that might be used for location of a fault (represented by the resistor symbol) that has occurred somewhere on the "ring" line of the pair. In order to achieve the configuration of FIG. 6A, the following relays of FIG. 4 are activated to their "set" position from their "reset" position in which all of the relays are shown: relay 108 (to "strap" pair 1) and relays 102, 107 and 109 to tie the "ring" line of pair 2 to the strap and leave the "tip" line of pair one open.

In diagram B, the active strap may be instructed to connect the tip lines of pairs 2 and 3 together and the ring lines of pairs 2 and 3 together. Such a connection provides a pair loop back for locating opens on the lines. For such a configuration, relays 102 and 103 are moved to their "set" condition; alternatively, relays 104 and 105 could be moved to their "set" condition.

In a like manner the active strap device can be instructed by the dual tone multi-frequency signals "dialed" from the craft phone to provide the configurations illustrated in diagrams C, D and E of FIG. 6.

In the configuration of diagram F of FIG. 6, two active strap devices are used to provide a two-ended working pair transfer with a tracing tone and a new pair loop back test. Those skilled in the art will recognize that the utility of such a configuration in relocating or moving a section of an active line pair with minimal interruption of services. In such a configuration the active straps are instructed over the control line pair to act in unison to transfer the end connections of the "common" lines from the "old pair" section to the "new pair" section. The transfer is done with a make-before-break switching. Immediately upon transfer the test set connected to the remote end of the loop back pair tests to verify proper transfer. If the transfer is incorrect the straps are immediately instructed by the test set to reverse the transfer.

Turning now to FIGS. 4 and 5, a more detailed explanation of the functions and operations of the elements of the analog board 24 and the processor board 27 will be given.

The actual switching functions providing connections between the various lines connected to the active strap are carried out by seventeen latching relays 100–116. These relays are of a two-coil latching type such as the commercially available Aeromat TQ series or equivalent. Both coils of all seventeen relays are powered by the direct unregulated battery voltage $V_{DD}$. The relays of the expansion modules are driven by the same voltage as will be discussed subsequently.

The "set" and "reset" coils of these relays are activated under the control of a series of shift registers comprising four integrated circuit devices 29–32. These IC shift register devices are of a type commercially available under the designation UCN5841 or of an equivalent type. Shift register devices 29–32 receive clock and strobe pulses generated on and delivered from the processor board 27 over lines 33 and 34, respectively. Data signals generated on the processor board are fed to the shift register string 29–32 over data line 35 to the data input terminal 36 of device 29. The data signals are fed from the output terminal of each register device 29–31 to the input of each succeeding register device 30–32, respectively. The output of register device 32 is fed over data output line 37 to a terminal of the expansion connector 38.

Thus, the switching relays 100–116 of the active strap device are activated under control of the processor 28 through shift registers 29–32 to provide the configuration of line interconnections at the active strap as input by the technician through dialed input signals at his location.

The following is by way of further specific illustration of some of the functions that may be accomplished through various condition sets of relays 100–116. Relays 100–103 are used selectively to connect their respective line pairs from the input connectors 48 to the main line pair busses 83 and 84. Relays 104 and 105 are used selectively to connect pair 1 or pair 2 to pair 3 independently of the main line pair busses 83 and 84. Relay 108 may be used to short or strap tip line to ring line of line pair 1 or line pair 2 as selected by relay 104. Relays 100 and 106 allow connection to the "talk" line pair 80 to line pair zero with the main line pair busses 83 or 84 either connected or bypassed. Relays 107, 109 and 110 allow the main line pair busses 83 and 84 to be variously configured as shown by the following truth table where S=set and R=reset.

|  | RELAY 107 | RELAY 109 | RELAY 110 |
|---|---|---|---|
| Open Lines | R | R | R |
| Line 84 Out | R | S | R |
| Line 83 Out | R | R | S |
| Both Lines Out | R | S | S |
| Strap Lines 83 & 84 | S | R | R |
| Ground Line 84 | S | S | R |
| Ground Line 83 | S | R | S |
| Ground Lines 83 & 84 | S | S | S |

Relay 111 may be used to add capacitance termination or to "build out" line pairs connected to busses 83 and 84. Relays 112–116 are used to achieve other configurations of lines connected to busses 83 and 84 including connections to and from the coder-decoder 31 on the processor board.

Turning now to the processor board 27, it mounts in addition to the processor IC 28, RAM 29, EPROM 30 and CODEC 31, a touchtone receiver 43, negative voltage power supply 44, regulated five volts supply 45, switching regulator 46 and associated circuit elements as diagrammed in FIG. 5.

Touchtone receiver unit 43 receives the command signals dialed into the strap device by the operating technician to configure the active strap. The dual tone multi-frequency signals are received from line pair zero on line 60 and converted to a four bit signal fed to data bus 61. Also generated in the receiver is an interrupt signal on line 62 to the processor 28. The receiver IC is of a type now essentially standard in the industry designated M8870.

Processor 28 is an integrated circuit unit of the type designated 86C93 designed for use with an external crystal such as shown at 63. Processor 28 communicates with random access memory IC 29, EPROM IC 30 and coder-decoder IC 31 over an eight bit data bus 61 and with memories 29 and 30 on eight bit address busses 64 and 65. It may be observed that data bus 61 in addition to connection to processor 28 is connected to IC device 51 and that address bus 64 is connected to other terminals of the IC unit 51. IC unit 51 is a flip-flop demultiplexer of the type designated as a 748C374.

Firmware programming controls processor 28 to receive command signals from receiver 43 and output test and function signals to operate and control the shift registers and relays of the analog board and the CODEC 31 as well as any expansion modules that may be connected to the active strap.

Also mounted on the processor board of the present embodiment in addition to the devices previously mentioned are power supplies for furnishing various voltages needed for operation of the several components of the active strap device.

For example, reference to FIGS. 4 and 5 shows that an unregulated voltage designated $V_{DD}$ of a nominal 7.2 volts DC is supplied by on-board nickel cadmium rechargeable battery 20 on line 66. The $V_{DD}$ voltage is used to power the coils of the 17 switching relays 100–116 of the active strap device as well as the coils of the switching relays of any expansion modules that may be connected thereto. The $V_{DD}$ is further applied to the regulated 5 volt supply chip 45 and the switching regulator chip 46. The $V_{DD}$ further supplies drive transistors 67, 68 and 69 supplying the strobe, data and clock pulse signals to the shift register string on lines 34, 35 and 33, respectively. These drive transistors which may be type 2N3904's are triggered by signals generated by the processor on lines 70, 71 and 72, respectively.

The diodes 73 in the $V_{DD}$ line allow recharging of the batteries 20 while switch 26 is open through connection of the recharging module 15 directly to connector 38 or to that connector through any attached expansion modules.

Regulated 5 volt supply chip 45 which may be an LM2925 or equivalent generates and supplies the $V_{CC}$ voltage (5 volt regulated) to power CODEC chip 31 negative voltage supply chip 44, receiver chip 43, logic element chip 47 as well as the shift register string 39–42 in the active strap and any additional shift registers in connected expansion modules.

Switching regulator chip 46 which may be an LM3578 along with associated components provides a unique regulated voltage source featuring three feed-back paths. Requirements of this supply are to produce −48 volts DC at approximately 23 ma. at high AC impedance. The oscillator of chip 46 operating at a frequency of approximately 30–40 kilohertz pulses PNP transistor 74. Inductance 75 draws current through diode 76 after each pulse thus incrementally charging capacitor 77 to operating voltage. Resistor 78 and capacitor 79 provide RC filtering of that voltage.

A voltage limit feed-back path through resistor 81 together with current devices within regulator chip 46 limit the pulse width of the output of that chip when the supply voltage approaches 48 volts. The regulator 46 limits the current (or total energy) that the chip can put into low ohm resistor 82 (0.2 ohms for example). At a certain current through resistor 82 the output transistor in the regulator chip is shut off thus shutting off transistor 74. Turn-on overload protection is thus provided.

In the supply output transistor 85 which may be a 2N3904 forms a self-biasing circuit in that the base current through resistor 86 also flows through emitter resistor 87. Capacitor 88 establishes a constant voltage across resistor 87 and since the emitter drop of transistor 85 is constant the current through resistor 87 is constant.

The constant voltage drop across resistor 87 is applied to the base of transistor 89 which may be a 2N3904 to produce a current feed-back of approximately 23 ma. through resistor 90 to control switching regulator 46.

Voltage at no load is essentially constant at 48 volts at the junction of resistor 78, 81, 87 and 91. When current is being drawn transistor 85 forms an artificial inductance with transistor 89 monitoring the voltage across resistor 87. When this voltage reaches approximately 1.2 volts transistor 89 turns "on" producing current feed-back to the switching device 46 to lower power thus providing a slow response constant current output with high AC impedance.

This supply then operates as a power limited supply wherein maximum load occurs at approximately 23 ma. at 48 volts. With a dead short across the output the battery current drain reduces since the current limitation produces a lowering of the voltage; the current limit is constant all the way down to zero volts.

Thus, it can be seen that this supply is particularly designed and adapted to conserve power in the environment described.

The negative voltage required for CODEC 31 is provided by the power supply IC 44 which may be a MAX 660 or equivalent CMOS switching oscillator using external capacitors and providing "charge pump" to produce at line 92 a negative mirror of the positive $V_{CC}$ supply on line 93.

The CODEC device 31 which may be a TP3058 comprises a switched capacitor input filter pass band of 200 to 3400 Hz followed by an A-D converter having a dynamic range of 13 bits using a μ log companding to produce an 8 bit output to data line 61. Also in the CODEC device 31 is a digital to analog converter followed by a filter with a frequency response of from 0 to 3400 Hz. Thus, under control of the processor 28 CODEC 31 can be used as a sampling A-D system for making AC measurements using digital signal processing techniques in the processor and as a wave form synthesizer using patterns of bytes stored in EPROM 30 and played out to the CODEC under the control of the processor 28.

IC chip 51 which may be of the type designated commercially as 748C374 is basically comprised of "flip-flop" devices and is used to separate and recover the address bits multiplexed with data bits on the data busses 61.

Logic elements 52, 56, 57 and 58 are used to activate address lines 92, 93 and 94 through the gates 56, 57 and 58 only when data memory access signal is "low true" to invertor 52.

The activation states of the ROM IC 29, EPROM IC 30, CODEC IC 31 and receiver IC 43 are controlled by various processor IC 28 output signals applied through logic elements 47, 49, 50 and 52–58. Elements 49 and 50 may be combined in a single integrated circuit element 96 such as a 748C139; element 47 may be of the type designated 748C151. Elements 52–55 may comprise a quad NOR gate device 97 such as 974HCO2 and elements 56–59 may be a quad AND gate device 98 such as for example a 748C08.

Figure 7A:
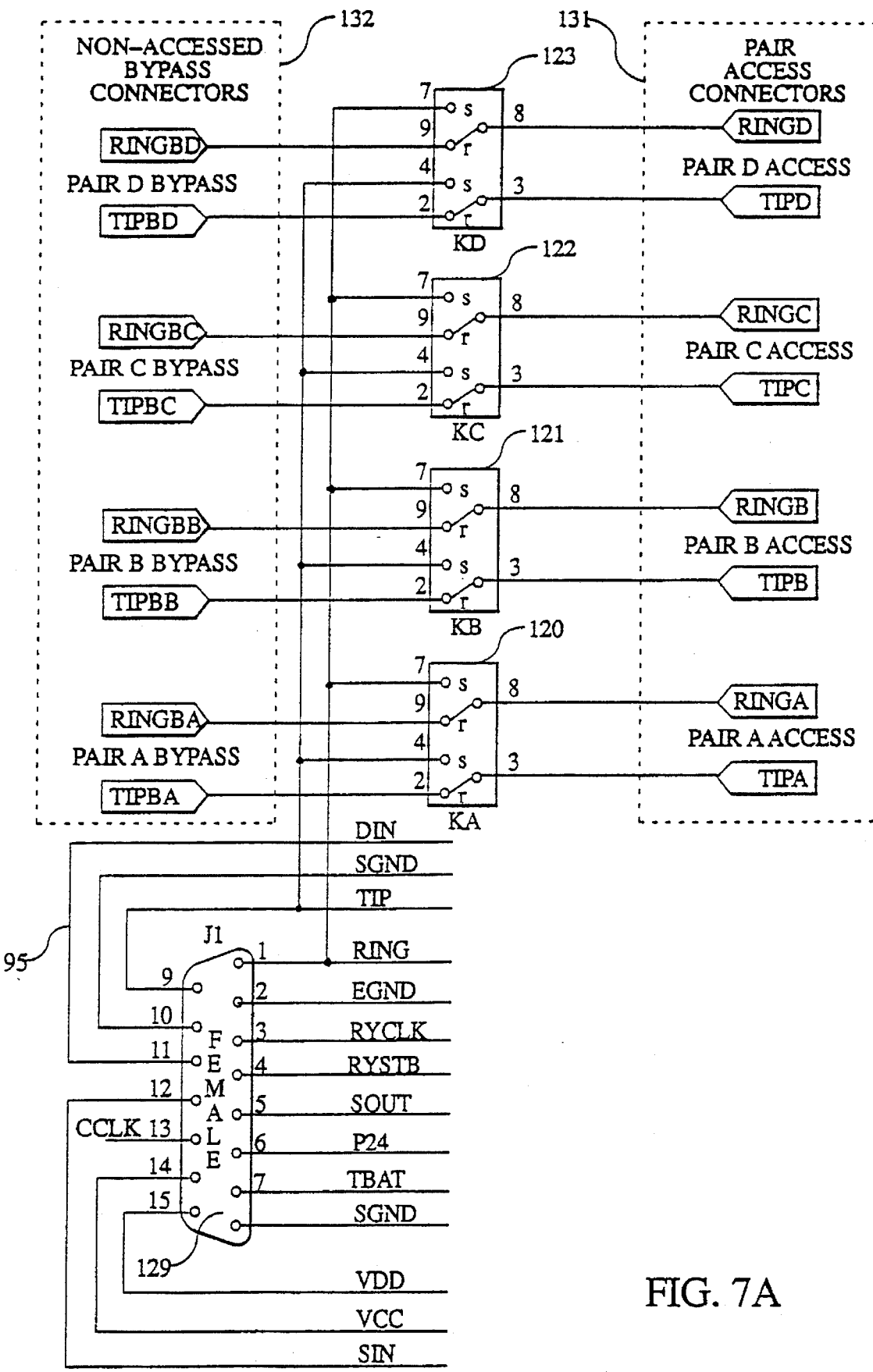
FIG. 7 is an electrical schematic diagram illustrating the interconnection of switching relays, shift register, relay drive circuits and other elements of an extension module compatible with the active strap device of the present invention.
Figure 7B:
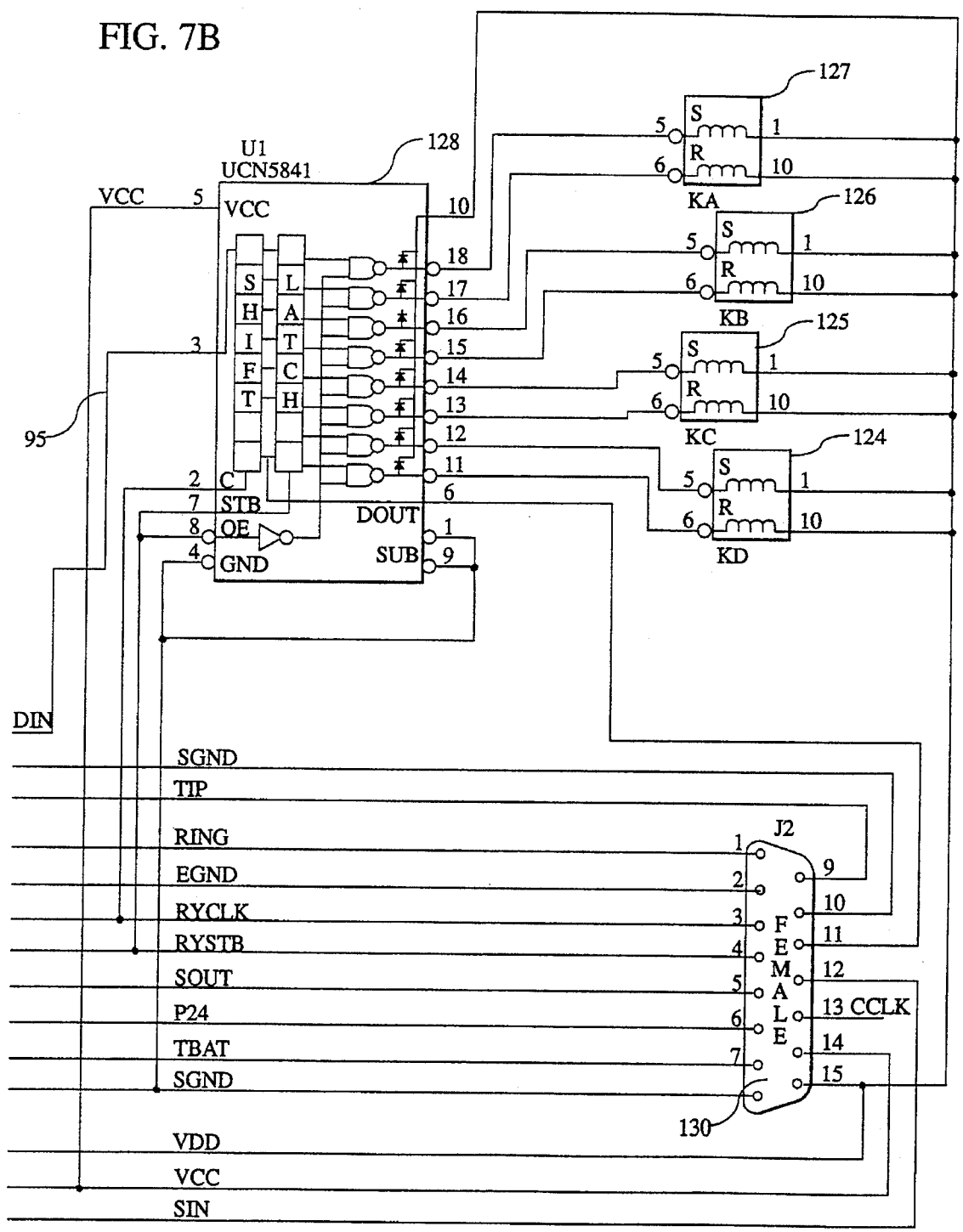

Turning now to FIG. 7, there is shown the schematic diagram of an expansion module 14 of the type useful with the active strap device of FIGS. 4 and 5. Included in the module 14 shown are four two-coil latching relays whose contact sets 120–123 are activated by their coil pairs 124–127. These relays may be of the same type as relays 100–116. Also included is an IC shift register 128 of the type compatible with the shift registers of the main strap unit shown in FIG. 4.

Further included are male connector 129 designed to mate with expansion connector 38 and female expansion connector 130 which is of the same design as connector 38. Expansion module 14 also has sixteen line pair connectors 131 providing test access to or bypass of the four line pairs connected thereto.

As can be seen when one or more expansion modules 14 are connected through connectors 38, 129 and 130 to the active strap unit 1 the analog board of FIG. 4 is effectively expanded to accommodate four or more additional line pairs. Specifically, $V_{CC}$, $V_{DD}$, ground strobe clock and other appropriate lines of the active strap are connected directly to corresponding lines of the expansion module. The data output line 37 of shift register 42 is connected to the input line 95 of shift register 128 thus adding that register to the series activated string of registers 39–42. As more expansion modules are added, the shift registers of each is added to the series string of registers.

Also the line pair busses 133 and 134 of the expansion module are connected to the active strap device pair busses 82 and 83, respectively through connectors 129 and 38.

Each of the relay contact sets 120–123 then under the control of shift register 128 will in this "set" condition connect the line pair from connector 131 with which they are associated to the pair busses 133 and 134 or in their "reset" state connect their associated line pair from terminal 131 to terminal 132 bypassing the pair busses 133 and 134.

It can be seen then that each expansion module allows four additional line pairs to be tied into the active strap device for remotely controlled connection into various configurations of the types exemplified by those of FIG. 6 for desired switching and/or testing functions.

Thus, there has been disclosed an active strapping device and accessory modules allowing repair or installation technicians to remotely control the interconnection configuration of section lengths of one or more line pairs or cables of electrical signal lines for various purposes.

Many changes and variations of the active strap device herein disclosed that are still within the spirit of the invention may occur to those skilled in the art and thus it is intended that this invention be limited only as set forth in the following claims.

What is claimed is:

1. A remotely controlled strapping and switching device comprising:

a plurality of input connector terminals;

a plurality of multiple contact switching relays, each of said relays having a first and a second contact connection condition and at least one activating coil element for changing said relay between said first and said second contact connection conditions;

a plurality of shift register devices having their data lines connected serially for selectively energizing said at least one activating coil element of selected ones of said plurality of relays;

and a digital processor and at least one memory device interactive with said processor for controlling said plurality of shift register devices to energize different ones of said activating coil elements in response to and in accordance with various combinations of instructional command signals received by said processor, said input connection terminals and said switching relay contact connections being so arranged constructed and interconnected as to selectably provide any of a plurality of predetermined connector terminal interconnections including interconnections of three or more of said input connector terminals in dependence upon the contact connection conditions of said plurality of relays.

2. The device as defined in claim 1 wherein said plurality of relays is comprised of dual coil latching relays.

3. The device as defined in claim 1 wherein said processor for controlling said plurality of shift registers is activated in response to decoded dual tone multi-frequency instructional command signals.

4. The device as defined in claim 2 wherein said processor for controlling said plurality of shift registers is activated in response to decoded dual tone multi-frequency instructional command signals.

5. The device of claim 1 further comprising at least one expansion module comprising:

an additional plurality of input connector terminals;

an additional plurality of multiple contact switching relays each of said relays having a first and a second contact connection condition and at least one activating coil element for changing said relay between said first and said second contact connection condition;

at least one additional shift register device having its data line connected in series with said data line of said plurality of shift register devices for selectively energizing said at least one activating coil element of selected ones of said additional plurality of relays; and connector means for electively electrically interconnecting selected ones of said contacts of said additional plurality of relays with corresponding contacts of selected ones of said plurality of relays and for temporarily electrically interconnecting said at least one additional shift register device to be controlled by said processor for controlling.

6. The device of claim 5 further comprising a second expansion module comprising components essentially identical to the components of said at least one expansion module.

7. The device of claim 5 wherein said plurality of additional relays are dual coil latching relays.

8. The device of claim 6 wherein said plurality of additional relays are dual coil latching relays.

9. The device of claim 7 further comprising a second expansion module comprising components essentially identical to the components of said at least one expansion module.

10. The device of claim 5 further comprising a rechargeable battery electrical power source providing power to both said strapping and switching device and said at least one expansion module and a battery recharging module including connector means for electively connecting the output of said recharging module to said rechargeable battery electrical power source.

11. The device of claim 5 wherein said processor for controlling said plurality of shift register devices and said at least one additional shift register device is activated in response to decoded dual tone multi-frequency instructional command signals.

12. The device of claim 9 wherein said processor for controlling said plurality of shift registers and said at least one additional shift register device is activated in response decoded to dual tone multi-frequency instructional command signals.

13. The device of claim 10 wherein said processor for controlling said plurality of shift register devices and said at least one additional shift register device is activated in response to decoded dual tone multi-frequency instructional command signals.

14. A remotely controlled strapping and switching device comprising:

a first plurality of input connector terminals;

a first plurality of multiple contact switching relays each of said relays having a first and a second contact connection condition and a first and a second activating coil element to place the relay associated therewith in said first and said second contact connection condition when energized respectively;

a plurality of shift register devices having their data lines connected serially for energizing selected ones of said coil elements;

means including a digital processor and memory interactive therewith for controlling said plurality of shift register devices to energize selected ones of said activating coil elements of said plurality of relays in selectable combinations in accordance with various combinations of decoded dual tone multi-frequency instructional command signals applied to said means for controlling;

a housing mounting said plurality of connector terminals, said plurality of relays, said plurality of shift register devices and said means for controlling said shift register devices;

at least one expansion module, each expansion module comprising: an additional plurality of input connector terminals; an additional plurality of multiple contact switching relays, each of said relays being essentially identical to the relays of said first plurality of switching relays; at least one additional shift register device for energizing selected ones of said activating coils of said additional plurality of relays in selectable combinations; and an additional housing mounting said additional plurality of terminals, said additional plurality of relays and said at least one additional shift register device; and connector means for electively electrically interconnecting selected ones of said contacts of said additional plurality of relays with corresponding contacts of selected ones of said first plurality of relays and said at least one additional shift register to be controlled by said means for controlling; said first plurality and said additional plurality of input connector terminals and the relay contact connections of said first plurality and said additional plurality of relays being so arranged constructed and interconnected as to provide selected connector terminal interconnections including interconnections of three or more terminals in dependence upon the contact connection condition of said plurality and said additional plurality of relays.

15. The device of claim 14 further comprising a rechargeable battery electrical power source mounted to said housing and a battery recharging module mounted to an auxiliary housing and charger connector means for electrically connecting the output of said recharging module to said rechargeable battery electrical power source.

16. The device of claim 9 further comprising a rechargeable battery electrical power source providing power to both said strapping and switching device and to said at least one and said second expansion modules and a battery recharging module including connector means for electively connecting the output of said recharging module to said rechargeable battery electrical power source.

* * * * *